United States Patent [19]

Pierce et al.

[11] Patent Number: 5,467,398

[45] Date of Patent: Nov. 14, 1995

[54] METHOD OF MESSAGING IN A COMMUNICATION SYSTEM

[75] Inventors: Jennifer A. Pierce, Algonquin; Louis D. Finkelstein, Wheeling; Daniel P. Brown, Elmhurst; Jay R. Krebs, Crystal Lake, all of Ill.

[73] Assignee: Motorola, Inc., Schaumburg, Ill.

[21] Appl. No.: 270,564

[22] Filed: Jul. 5, 1994

[51] Int. Cl.$^6$ .............................. H04L 9/22; H04L 9/32; H04L 9/16

[52] U.S. Cl. .................. 380/44; 380/21; 380/23

[58] Field of Search .................. 380/21, 23, 44

[56] References Cited

U.S. PATENT DOCUMENTS

| | | | |
|---|---|---|---|
| 4,268,715 | 5/1981 | Atalla | 380/23 |
| 4,876,716 | 10/1989 | Okamoto | 380/21 |
| 5,077,790 | 12/1991 | D'Amico et al. | 380/23 |
| 5,196,840 | 3/1993 | Leith et al. | 380/21 X |
| 5,227,613 | 7/1993 | Takagi et al. | 380/21 X |
| 5,249,230 | 9/1993 | Mihm, Jr. | 380/23 |
| 5,301,247 | 4/1994 | Rasmussen et al. | 380/21 X |
| 5,341,427 | 8/1994 | Hardy et al. | 380/21 |
| 5,392,356 | 2/1995 | Konno et al. | 380/23 |
| 5,410,602 | 4/1995 | Finkelstein et al. | 380/21 |

*Primary Examiner*—Gilberto Barrón, Jr.
*Attorney, Agent, or Firm*—Daniel C. Crilly; Jeffrey G. Toler

[57] ABSTRACT

A communication system (100) employs a method of messaging between a subscriber unit (105) and an infrastructure communication center (101). A messaging key associated with a subscriber unit reference number is provided (203, 403) to the subscriber unit (105) and to the infrastructure communication center (101). An authentication key and/or an identifier for the subscriber unit (105) is then produced (300, 407) by either the subscriber unit (105) or the infrastructure communication center (101). The authentication key and/or the identifier is encrypted (207, 413) with the messaging key and is subsequently communicated (209, 415) between the subscriber unit (105) and the infrastructure communication center (101).

25 Claims, 4 Drawing Sheets

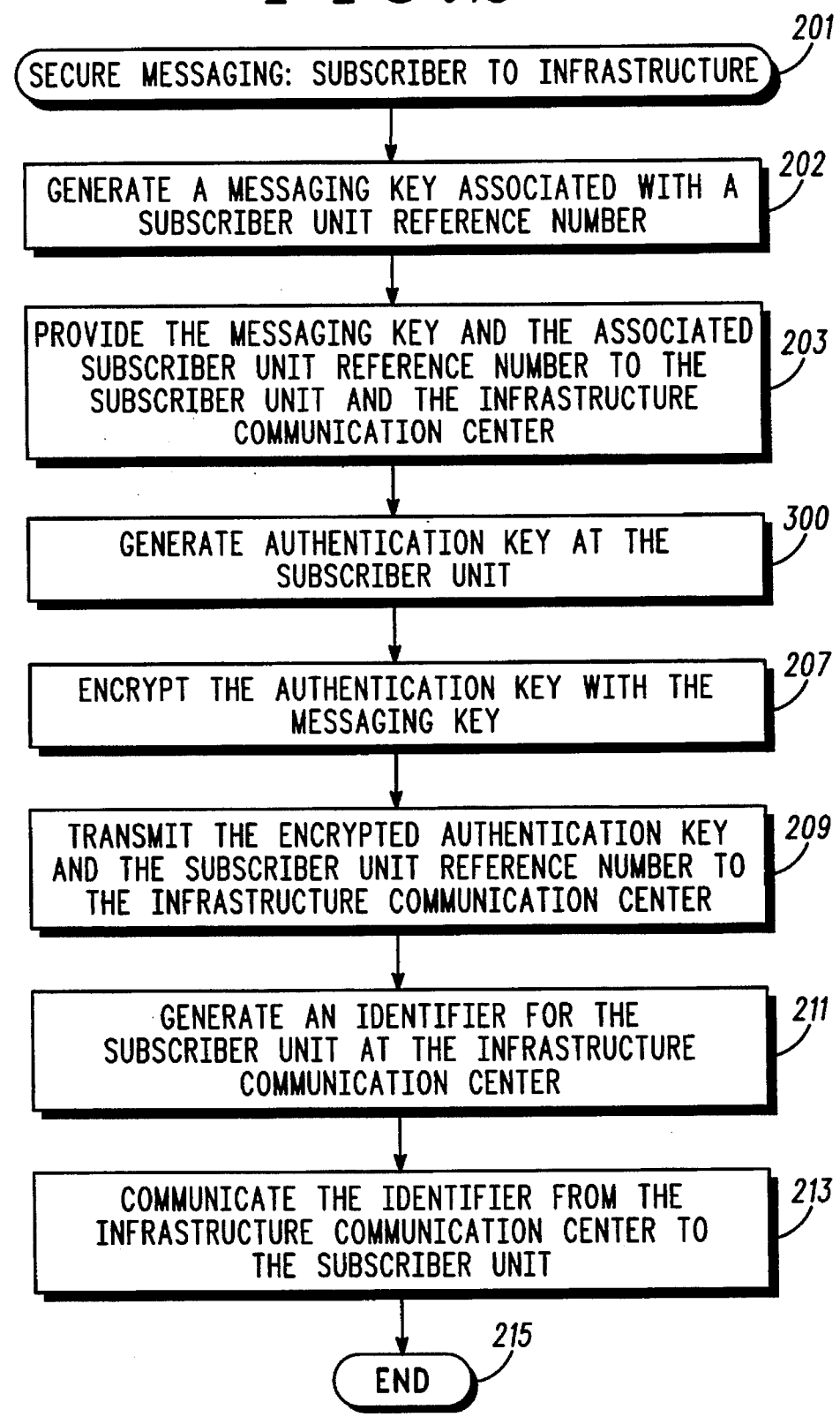

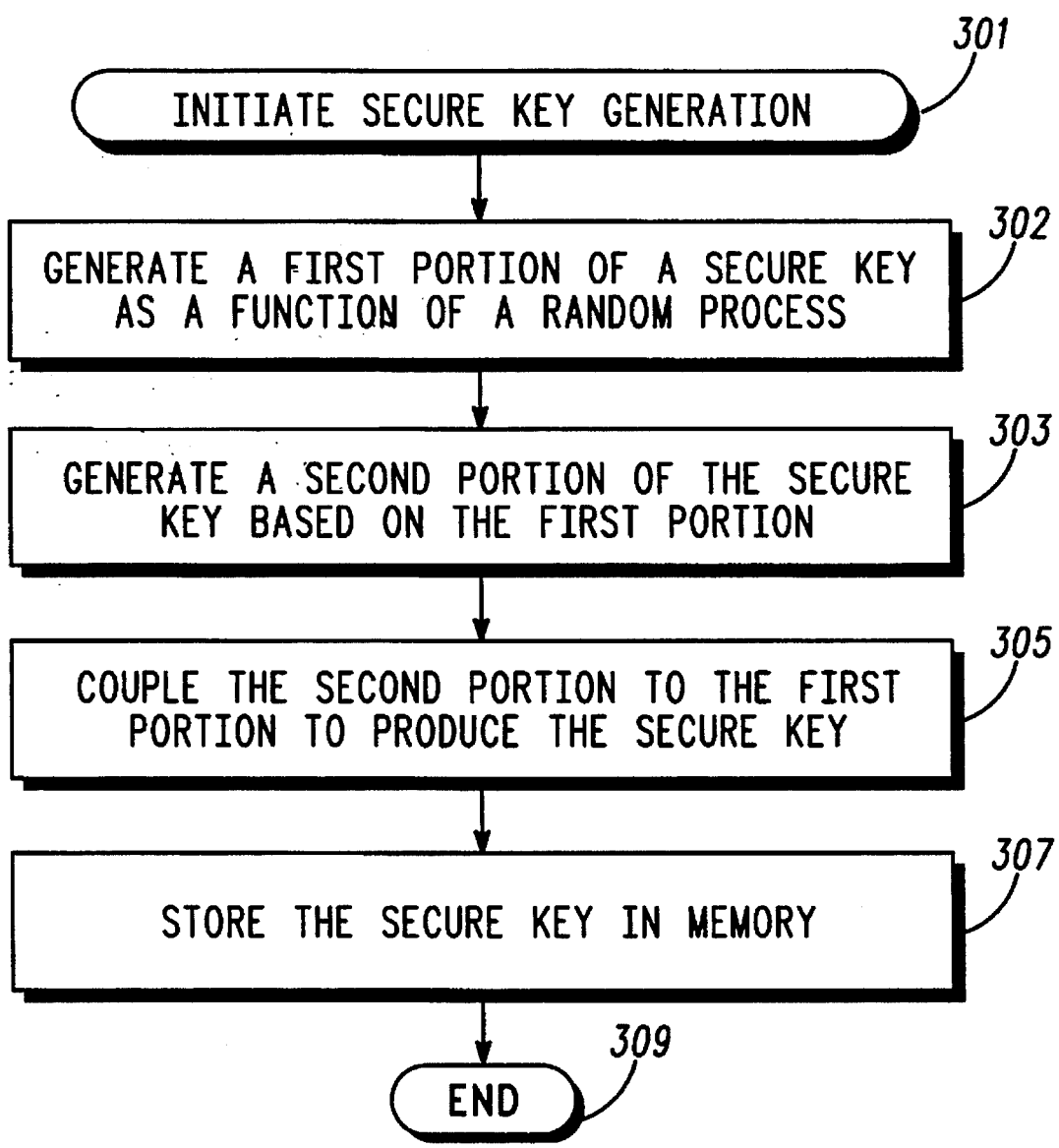

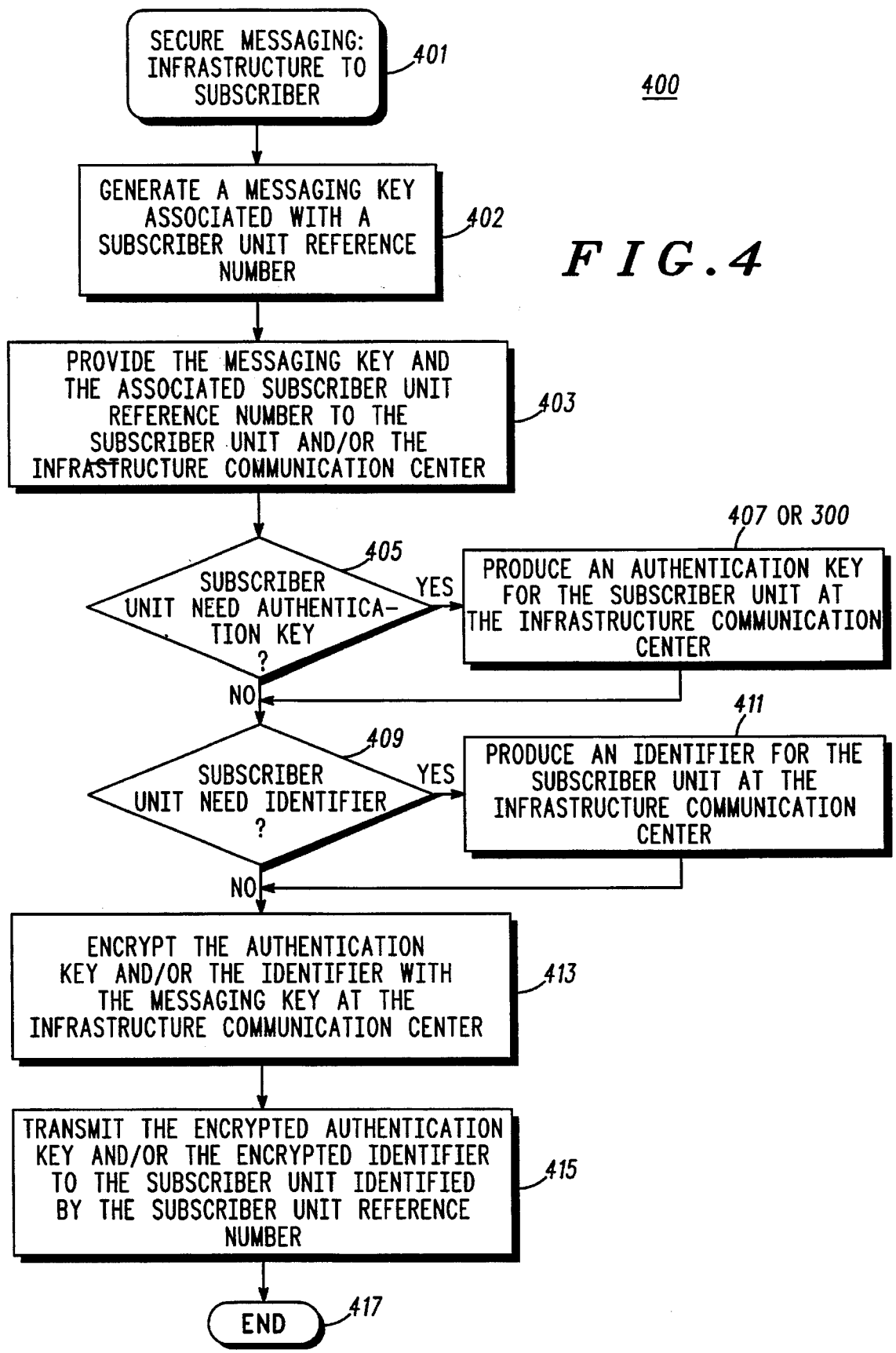

5,467,398

METHOD OF MESSAGING IN A COMMUNICATION SYSTEM

FIELD OF THE INVENTION

The present invention relates generally to communication systems and, in particular, to a method of messaging in a communication system.

BACKGROUND OF THE INVENTION

Communication systems, such as cellular or trunked communication systems, are known to include a plurality of subscriber units and an infrastructure communication center that is typically controlled by a service provider. Depending on the type of system, the subscriber units might comprise cellular telephones or two-way radio devices. Each subscriber unit is fabricated by a particular manufacturer and is assigned a corresponding serial number. The infrastructure communication center is typically connected to a plurality of base sites that provide radio communication channels to the subscriber units. The infrastructure communication center typically includes a home location register (HLR) that is coupled to a switch. As is known, the switch controls subscriber unit access to the radio channels and provides interconnection to the public switched telephone network.

Prior to service activation of a subscriber unit, an employee for the service provider typically allocates a mobile identification number (MIN) for the subscriber unit and stores the identification number in the subscriber unit. The employee also stores the identification number and the corresponding subscriber unit serial number in the HLR. The subscriber identification number enables the subscriber unit to access the particular communication system and is used by the service provider to monitor the amount of service (e.g., air time) provided to the subscriber unit. With this procedure, service is available from the service provider within a nominal activation time period after the user of the subscriber unit requests service activation (e.g., at the point of sale of the subscriber unit). Although this approach is straightforward, access to subscriber unit identification numbers and corresponding subscriber unit serial numbers is readily available to employees of the service provider. Unfortunately, this uncontrolled access has accounted for numerous occurrences of service fraud resulting from the cloning of subscriber units (i.e., copying the identification number and serial number assigned to one subscriber unit into another subscriber unit).

In an attempt to reduce the occurrences of service fraud, two security concepts have been recommended. The first concept has been recommended for the existing United States Digital Cellular (USDC) Systems based on Telecommunications Industry Association/Electronics Industry Association Interim Standards 54 and 95 (TIA/EIA IS-54 and IS-95). This technique requires the service provider to send an authorization code to the user of the subscriber unit via the United States Postal Service. Upon receipt of the code, the user enters the authorization code into the subscriber unit, provided the subscriber unit has a keypad, to activate service. Although this approach offers adequate security, it imparts an unwelcome burden on the user of the subscriber unit. Further, this technique includes an inherent delay between the request for service and the activation of service due to the mail delivery of the authorization code.

The second concept is currently being used in the Groupe Special Mobile (GSM) Pan European cellular communication system (also denoted the Global System for Mobile communication). This approach requires the user of a subscriber unit to insert an authorization card into a card reader that accompanies the subscriber unit prior to use. The authorization card includes the subscriber unit's identification number and a secure key. The secure key is a digital word that further identifies the subscriber unit and is typically used by the service provider to confirm a subscriber unit's system access privileges. Accordingly, this technique imparts the burden of requiring the subscriber unit's user to carry an authorization card whenever the user intends to utilize the subscriber unit. Further, this approach requires that the additional card reader hardware be purchased in conjunction with the subscriber unit, thereby raising the cost of owning the subscriber unit.

Therefore, a need exists for a method of secure messaging in a communication system that provides for secure use of a subscriber unit's identification number and secure key without imparting any additional burden on the subscriber unit's user, without causing undue delays in service activation, and without requiring additional hardware to accompany the subscriber unit.

BRIEF DESCRIPTION OF THE DRAWINGS

FIG. 2 illustrates a logic flow diagram of steps executed to provide secure messaging from a subscriber unit to an infrastructure communication center in accordance with the present invention.

FIG. 3 illustrates a logic flow diagram of steps executed to generate a secure key at a subscriber unit in accordance with a preferred embodiment of the present invention.

FIG. 4 illustrates a logic flow diagram of steps executed to provide secure messaging from an infrastructure communication center to a subscriber unit in accordance with the present invention.

DESCRIPTION OF A PREFERRED EMBODIMENT

Figure 1:
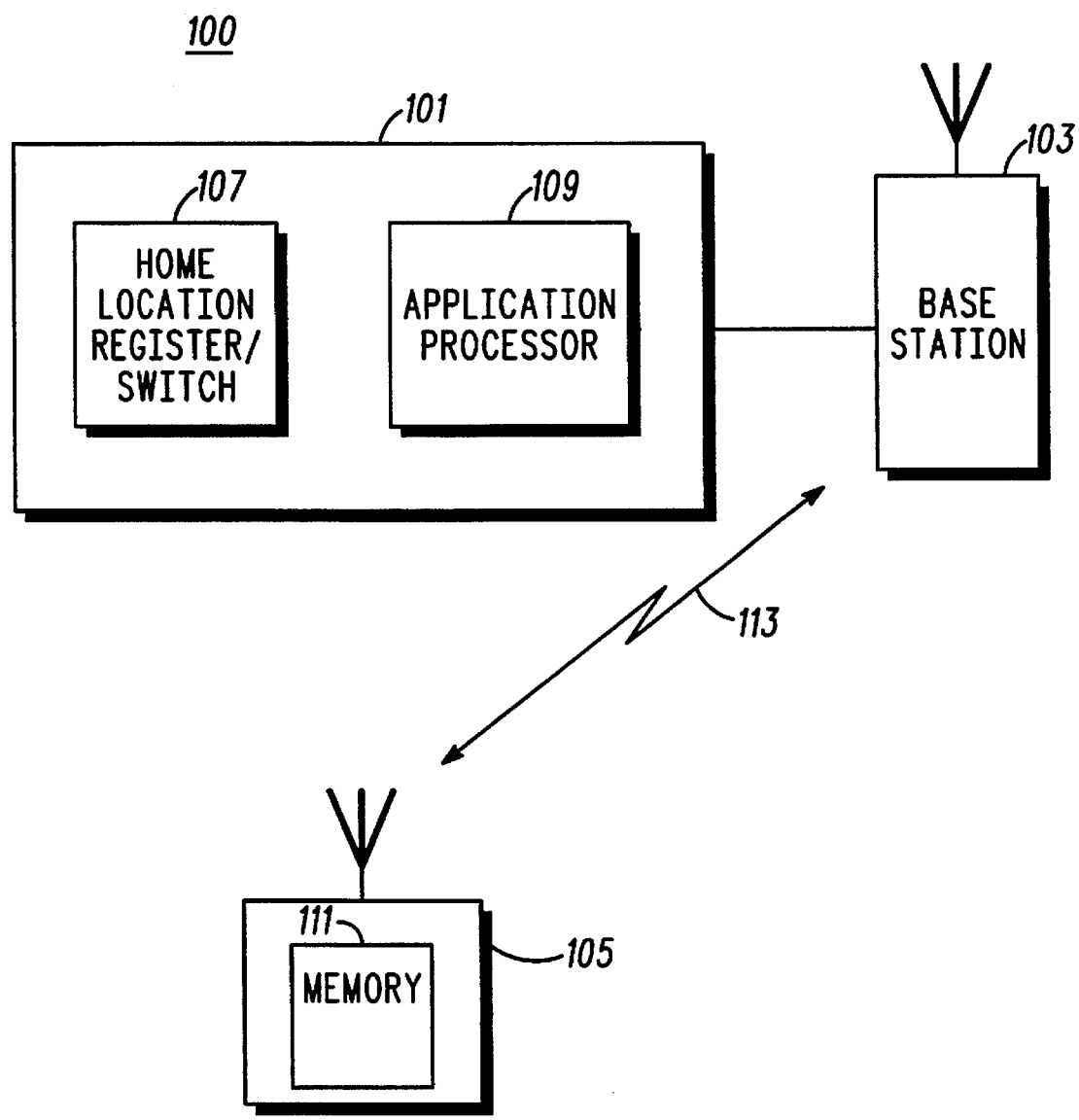
FIG. 1 illustrates a communication system in accordance with the present invention.

Generally, the present invention provides a method of messaging between a subscriber unit and an infrastructure communication center in a communication system. A messaging key associated with a subscriber unit reference number is provided to the subscriber unit and to the infrastructure communication center. An authentication key (e.g., a system authorization code) and/or an identifier for the subscriber unit is then produced by either the subscriber unit or the infrastructure communication center. The authentication key and/or the identifier is encrypted with the messaging key and is automatically communicated between the subscriber unit and the infrastructure communication center. By transferring a subscriber unit's authentication key and/or identifier in this manner, the present invention alleviates the authentication burden imparted on subscriber unit users in existing communication systems, while minimizing unauthorized access to such systems.

The present invention can be more fully described with reference to FIGS. 1–4. FIG. 1 illustrates a communication system 100 that includes an infrastructure communication center 101 and a subscriber unit 105, in accordance with the present invention. In a preferred embodiment, the infrastructure communication center 101 is coupled to a base station 103 (e.g. via a cable or a radio frequency link); however, the base station 103 might alternatively be embodied within the infrastructure communication center 101. The infrastructure communication center 101 includes a well-known home location register (HLR), or other comparable database, in conjunction with a switch (HLR/switch 107) and an application processor 109. The subscriber unit 105 includes, inter alia, a memory device 111. Communication between the subscriber unit 105 and the infrastructure communication center 101 is preferably accomplished using a radio frequency (RF) channel or link 113.

The subscriber unit 105 preferably comprises a radiotelephone, a portable radio, a mobile radio, or any other two-way communicating device. However, the subscriber unit 105 might alternatively be a one-way communication device, such as a pager. The memory device 111 preferably comprises a writeable memory device, such as a random access memory (RAM), a programmable read-only memory (PROM), or an electrically erasable PROM.

The infrastructure communication center 101 preferably comprises the switching and controlling equipment necessary to support an RF cellular telephone communication system 100 or a trunked communication system, such as a personal communication system (PCS) or a wireless local loop (WILL). The switch portion of the HLR/switch 107 might comprise a commercially available Motorola EMX 2500 switch. The application processor 109 preferably comprises a microprocessor, such as one of the family of Motorola MC68000 microprocessors.

Operation of the communication system 100 in accordance with a preferred embodiment of the present invention can be more fully described with reference with FIG. 2. FIG. 2 illustrates a logic flow diagram 200 of steps executed to provide secure messaging from the subscriber unit 105 to the infrastructure communication center 101. The logic flow begins (201) when, at particular periods of time when the subscriber unit 105 desires to become registered in the communication system 100 (e.g., when initiating service), a messaging key associated with the subscriber unit's reference number (e.g., serial number) is generated (202) by either the infrastructure communication center 101, the subscriber unit 105, or a device external to the infrastructure communication center 101 and the subscriber unit 105. In a preferred embodiment, the messaging key comprises an externally generated secure key, such as a 64 bit encryption key. In an alternate embodiment, the encryption key might be subsequently used to generate a 512 bit encryption mask that then comprises the messaging key. In yet another embodiment, the messaging key might be generated by the infrastructure communication center 101 based on an authentication key (later described) that corresponds to the subscriber unit reference number. In a further embodiment, the messaging key might be generated by the subscriber unit 105. Secure key generation in the subscriber unit 105 is detailed below with respect to HG. 3.

Once the messaging key is generated, the messaging key and the associated subscriber unit reference number are provided (203) to the subscriber unit 105 and/or the infrastructure communication center 101, depending upon where the messaging key was produced. If the infrastructure communication center 101 generated the messaging key, the messaging key may be transmitted to the subscriber unit 105 using the RF link 113, a cable, or other type of electrical medium. In a similar manner, if the subscriber unit 105 generated the messaging key, the messaging key may be transmitted to the infrastructure communication center 101 using the RF link 113. If the messaging key is generated external to the subscriber unit 105 and the infrastructure communication center 101, the messaging key might be downloaded to both entities using an electronic data bus, a wireline, or other type of electrical medium. The subscriber unit reference number is then stored in the HLR/switch 107 of the infrastructure communication center 101 and at the subscriber unit 105.

Having obtained the messaging key and the associated subscriber unit reference number, the subscriber unit 105 generates (300) an authentication key. The authentication key is preferably a bit stream used to confirm authorized access to the communication system 100. In a preferred embodiment, the authentication key comprises a 128 bit (32 hex characters) digital word. The authentication key is preferably generated as detailed below with regard to FIG. 3. Upon generating the authentication key, the subscriber unit 105 encrypts (207) the authentication key with the messaging key. The encryption is preferably performed by using well-known encryption techniques. The encrypted authentication key and the subscriber unit reference number are subsequently transmitted (209), or otherwise communicated, from the subscriber unit 105 to the infrastructure communication center 101. In a preferred embodiment, the transmission is performed via the RF link 113; however, a variety of other electrical media, such as a cable, an infra-red link, a fiber optic link, or a satellite link, might be alternatively employed.

Upon receiving the encrypted authentication key from the subscriber unit 105, the infrastructure communication center 101 decrypts the encrypted authentication key and stores the authentication key in the HLR/switch 107 such that the authentication key corresponds with the previously stored subscriber unit reference number. The authentication key and the subscriber unit reference number are periodically used by the infrastructure communication center 101 to verify the subscriber unit's authorized access to the communication system 100.

Continuing down the logic flow diagram 200, the infrastructure communication center 101 generates (211) an identifier (e.g., a mobile identification number) for the subscriber unit 105 and transmits, or otherwise communicates (213), the identifier to the subscriber unit 105—for example, using the RF link 113. In an alternate embodiment, the infrastructure communication center 101 might allocate the identifier from a preestablished list of identifiers. In a preferred embodiment, the infrastructure communication center 101 stores the identifier and the subscriber unit reference number in a memory portion of the application processor 109. Upon completing the transmission of the identifier, the logic flow ends (215). It should be noted that although it is preferred to encrypt the authentication key prior to transmitting the authentication key to the infrastructure communication center 101, an alternate embodiment might transmit the unencrypted authentication key to the infrastructure communication center 101 when a secure transmission is not required.

FIG. 3 illustrates a logic flow diagram of steps executed to generate (300) a secure key in accordance with a preferred embodiment of the present invention. As discussed above, the socalled secure key preferably comprises the authentication key, although the succeeding methodology is equally applicable for generating the messaging key. To initiate (301) the procedure at the subscriber unit 105, the subscriber unit 105 generates (302) a first portion of the secure key as a function of a random process. In a preferred embodiment, the first portion comprises 112 bits (twenty-eight hex characters) generated using a random number generator.

Subsequent to generating the first portion, the subscriber unit 105 generates (303) a second portion of the secure key based on the first portion. The second portion preferably comprises sixteen bits (four hex characters) that are computed by applying a recursive polynomial code to the first portion. The computation of the second portion begins by inputting a first pair of the twenty-eight hex characters in the first portion together with a code number (e.g., from a lookup table) into a polynomial formula (e.g., a cubic formula). The product of the initial computation is then used together with a second pair of the twenty-eight hex characters in the first portion and a new code number as the recursive input to the polynomial formula. This process continues until all fourteen pairs of the twenty-eight hex characters in the first portion have been used as inputs to the polynomial formula. The final computation result comprises the second portion. The second portion is preferably used as a checksum by the infrastructure communication center 101 to validate the subscriber unit's secure key upon reception of a communication from the subscriber unit 105. In a preferred embodiment, the second portion is appended (305) to the first portion to form the complete secure key. However, it is understood that the second portion can be coupled (305) to various points of the first portion depending on the desired secure key construction. Once the secure key has been generated, the subscriber unit stores (307) the secure key in its memory 111 and the logic flow ends (309).

As described above with regard to FIGS. 2–3, the present invention provides a method for generating a secure key (e.g., an authentication key) within a subscriber unit, encrypting the secure key, and subsequently communicating the encrypted secure key to the infrastructure communication center. This approach allows the infrastructure communication center to automatically obtain the subscriber unit's randomly generated authentication key when the subscriber unit's service is activated, without requiring any human intervention during the key generation or transmission processes. Thus, in contrast to prior art methods of producing authentication keys, the present invention removes the burden imparted on a user of the subscriber unit of inserting an access card prior to use or entering a long access code prior to activation of service in the communication system. Further, since the key generation preferably occurs within the subscriber unit, operators at the infrastructure communication center that do not have proper authority to access the HLR/switch cannot obtain the secure key. Thus, the present invention reduces the potential for cloning of subscriber units by persons associated with the infrastructure communication center. Still further, the present invention provides a convenient means for periodically changing a subscriber unit's authentication key to further reduce the potential for cloning.

FIG. 4 illustrates a logic flow diagram 400 of steps executed to provide secure messaging from the infrastructure communication center 101 to the subscriber unit 105 in accordance with an alternate embodiment of the present invention. Similar to the discussion with regard to FIG. 2, the logic flow begins (401) when a messaging key associated with the subscriber unit's reference number (e.g., serial number) is generated (402) by either the infrastructure communication center 101, the subscriber unit 105, or a device external to the infrastructure communication center 10 1 and the subscriber unit 105. Once the messaging key is generated, the messaging key and the associated subscriber unit reference number are provided (403) to the subscriber unit 105 and/or the infrastructure communication center 101, as described above.

Having obtained the messaging key and the associated subscriber unit reference number, the infrastructure communication center 101 determines (405) whether the subscriber unit 105 needs an authentication key. The subscriber unit 105 needs an authentication key when initiating or confirming service in the communication system 100. The infrastructure communication center 101 might also determine that the subscriber unit 105 requires a new authentication key after using a previous key for a predetermined period of time (e.g., one month). When the infrastructure communication center 101 determines that the subscriber unit 105 needs an authentication key, the infrastructure communication center 101 produces (407) an authentication key for the subscriber unit 105. The infrastructure communication center 101 might allocate the authentication key to the subscriber unit 105 from a list of authentication keys residing in a database. In another embodiment, the infrastructure communication center 101 might generate (300) the authentication key in a manner similar to that described above for the subscriber unit 105. In a preferred embodiment, the infrastructure communication center 101 stores the authentication key in the HLR/switch 107.

Continuing down the logic flow diagram 400, the infrastructure communication center 101 determines (409) whether the subscriber unit needs an identifier. In a preferred embodiment, the subscriber unit only needs to obtain an identifier when activating service in the communication system 100. However, in an alternate embodiment, updating of the subscriber unit's identifier might be required to further inhibit unauthorized access to the communication system 100. When the subscriber unit 105 needs an identifier, the infrastructure communication center 101 produces (411) the identifier for the subscriber unit 105. In a manner analogous to the production (407) of the authentication key, the infrastructure communication center 101 might allocate, or generate, the identifier depending on the configuration of the infrastructure communication center 101. In a preferred embodiment, the infrastructure communication center 101 stores the identifier in the HLR/switch 107 and the application processor 109, such that the identifier corresponds to the authentication key in the HLR/switch 107 and the subscriber unit serial number in the application processor 109.

After the identifier is produced or when the subscriber unit 105 does not need an identifier, the infrastructure communication center 101 encrypts (413) the authentication key and/or the identifier with the messaging key. The encryption is performed in a manner similar to that discussed above with regard to FIG. 2. The infrastructure communication center 101 then transmits (415), or otherwise communicates, the encrypted authentication key and/or the encrypted identifier to the subscriber unit 105 identified by the subscriber unit reference number and the logic flow ends (417).

The present invention provides a method of secure messaging between a subscriber unit and an infrastructure communication center in a communication system. With this invention, the potential for service fraud can be significantly reduced since human intervention is not required during the generation of the authentication key or during the transfer of the key between the subscriber unit and the infrastructure communication center. In addition, lack of human intervention removes the authentication burden that prior art security techniques impart on subscriber unit users. Further, the present invention eliminates the need for additional hardware to insure subscriber unit security since the present invention includes the means for providing the security directly within the subscriber unit, as opposed to accompanying the subscriber unit as in the prior art GSM system.

What is claimed is:

1. In a communication system having a subscriber unit and an infrastructure communication center, a method of producing a secure key comprising the steps of:

a) generating, by the subscriber unit, a first portion of a secure key as a function of a random process;

b) generating a second portion of the secure key based on the first portion; and c) coupling the second portion to the first portion to produce the secure key.

2. The method of claim 1, further comprising the step of storing the secure key in a memory of the subscriber unit.

3. The method of claim 1, further comprising the step of:

d) communicating the secure key from the subscriber unit to the infrastructure communication center.

4. The method of claim 3, wherein step (d) comprises the step of transmitting the secure key from the subscriber unit to the infrastructure communication center through an electrical medium.

5. The method of claim 4, wherein the electrical medium comprises a radio frequency link.

6. A method of messaging in a communication system having a subscriber unit and an infrastructure communication center, the method comprising the steps of:

a) providing a messaging key associated with a subscriber unit reference number to the subscriber unit and to the infrastructure communication center;

b) producing an authentication key for the subscriber unit at the infrastructure communication center;

c) encrypting the authentication key with the messaging key at the infrastructure communication center to produce an encrypted authentication key; and d) communicating the encrypted authentication key to the subscriber unit identified by the subscriber unit reference number.

7. The method of claim 6, wherein step (b) further comprises the step of producing an identifier for the subscriber unit at the infrastructure communication center.

8. The method of claim 7, wherein step (c) further comprises the step of encrypting the identifier with the messaging key at the infrastructure communication center.

9. The method of claim 8, wherein step (d) further comprises the step of communicating the encrypted identifier to the subscriber unit identified by the subscriber unit reference number.

10. The method of claim 6, wherein the messaging key comprises an encryption key.

11. The method of claim 6, wherein the messaging key comprises an encryption mask.

12. The method of claim 6, wherein step (a) comprises the step of generating the messaging key at the infrastructure communication center based on an authentication key prior to providing the messaging key to the subscriber unit.

13. The method of claim 6, wherein step (a) further comprises the step of:

a1) generating the messaging key at the subscriber unit prior to the step of providing the messaging key to the infrastructure communication center.

14. The method of claim 13, wherein step (a1) comprises the steps of:

a1a) generating a first portion of the messaging key as a function of a random process;

a1b) generating a second portion of the messaging key based on the first portion; and a1c) coupling the second portion to the first portion to produce the messaging key.

15. The method of claim 6, wherein step (d) comprises the step of transmitting the encrypted authentication key to the subscriber unit using a radio frequency link.

16. A method of messaging in a communication system having a subscriber unit and an infrastructure communication center, the method comprising the steps of:

a) providing a messaging key associated with a subscriber unit reference number to the subscriber unit and to the infrastructure communication center;

b) producing an identifier for the subscriber unit at the infrastructure communication center;

c) encrypting the identifier with the messaging key at the infrastructure communication center to produce an encrypted identifier; and d) communicating the encrypted identifier to the subscriber unit identified by the subscriber unit reference number.

17. The method of claim 16, wherein the messaging key comprises an encryption key.

18. The method of claim 16, wherein step (a) further comprises the step of:

a1) generating the messaging key at the subscriber unit prior to the step of providing the messaging key to the infrastructure communication center.

19. The method of claim 18, wherein step (a1) comprises the steps of:

a1a) generating a first portion of the messaging key as a function of a random process;

a1b) generating a second portion of the messaging key based on the first portion; and a1c) coupling the second portion to the first portion to produce the messaging key.

20. The method of claim 16, wherein step (d) comprises the step of transmitting the encrypted identifier to the subscriber unit using a radio frequency link.

21. A method of messaging in a communication system having a subscriber unit and an infrastructure communication center, the method comprising the steps of:

a) providing a messaging key associated with a subscriber unit reference number to the subscriber unit and to the infrastructure communication center;

b) generating an authentication key at the subscriber unit;

c) encrypting the authentication key with the messaging key at the subscriber unit to produce an encrypted authentication key; and d) communicating the encrypted authentication key and the subscriber unit reference number to the infrastructure communication center.

22. The method of claim 21, wherein the messaging key comprises an encryption key.

23. The method of claim 21, wherein step (b) comprises the steps of:

b1) generating a first portion of the authentication key as a function of a random process;

b2) generating a second portion of the authentication key based on the first portion; and b3) coupling the second portion to the first portion to produce the authentication key.

24. The method of claim 21, wherein step (d) comprises the step of transmitting the encrypted authentication key and the subscriber unit reference number using a radio frequency link.

25. The method of claim 21, further comprising the steps of:

e) generating an identifier for the subscriber unit at the infrastructure communication center; and f) communicating the identifier from the infrastructure communication center to the subscriber unit.

* * * * *